US012601904B2

(12) United States Patent
Zhou et al.

(10) Patent No.: US 12,601,904 B2
(45) Date of Patent: Apr. 14, 2026

(54) RANGING AND BALLISTIC DISPLAY OPTICAL SIGHT

(71) Applicant: Henrich Technology Co., Ltd, Beijing (CN)

(72) Inventors: Wei Zhou, Beijing (CN); Congcong Sha, Beijing (CN); Jiawen Tu, Beijing (CN); Fei Ren, Beijing (CN)

(73) Assignee: Henrich Technology Co., Ltd, Beijing (CN)

( * ) Notice: Subject to any disclaimer, the term of this patent is extended or adjusted under 35 U.S.C. 154(b) by 266 days.

(21) Appl. No.: 18/117,408

(22) Filed: Mar. 4, 2023

(65) Prior Publication Data

US 2024/0061231 A1 Feb. 22, 2024

(30) Foreign Application Priority Data

Aug. 18, 2022 (CN) .......................... 202211004038.7

(51) Int. Cl.
G02B 23/10 (2006.01)
F41G 1/473 (2006.01)
(Continued)

(52) U.S. Cl.
CPC ........... G02B 23/105 (2013.01); F41G 1/473 (2013.01); F41G 1/54 (2013.01); G01B 11/14 (2013.01);
(Continued)

(58) Field of Classification Search
CPC ........ G02B 23/105; G02B 1/11; G02B 7/023; G02B 27/1066; F41G 1/473; F41G 1/54;
(Continued)

(56) References Cited

U.S. PATENT DOCUMENTS

2012/0145785 A1* 6/2012 Scrogin ................... F41G 3/065
235/404
2016/0047627 A1* 2/2016 Liang ...................... F41G 1/473
42/115
(Continued)

FOREIGN PATENT DOCUMENTS

CN 202361892 U * 8/2012
CN 108731542 A * 11/2018 ............... F41G 1/14
(Continued)

OTHER PUBLICATIONS

English Translation of Qin et al. CN-113865431-A Description (Year: 2021).*

(Continued)

*Primary Examiner* — Tarifur R Chowdhury
*Assistant Examiner* — Akbar H. Rizvi
(74) *Attorney, Agent, or Firm* — Analects Legal LLC

(57) ABSTRACT

The invention relates to a ranging and ballistic display optical sight featuring a mounting bracket, control mainboard, laser emitter, and receiver. An objective lens group and beam splitter prism are arranged coaxially, with the prism positioned above the laser receiver. The laser beam emitted is reflected by the prism into the receiver. A digital reticle plate, aligned with the optical path, displays the range data. The control mainboard calculates distance based on the time difference between laser emission and reception, then displays the result on the reticle. This system enhances shooting precision and efficiency.

10 Claims, 6 Drawing Sheets

(51) Int. Cl.

| | |
|---|---|
| *F41G 1/54* | (2006.01) |
| *G01B 11/14* | (2006.01) |
| *G02B 1/11* | (2015.01) |
| *G02B 7/02* | (2021.01) |
| *G02B 27/10* | (2006.01) |
| *H01S 3/00* | (2006.01) |

(52) U.S. Cl.
CPC ................ *G02B 1/11* (2013.01); *G02B 7/023* (2013.01); *G02B 27/1066* (2013.01); *H01S 3/0007* (2013.01)

(58) Field of Classification Search
CPC ..... F41G 1/38; F41G 1/14; F41G 1/26; F41G 1/467; F41G 1/52; G01B 11/14; H01S 3/0007
See application file for complete search history.

(56) References Cited

U.S. PATENT DOCUMENTS

| | | | |
|---|---|---|---|
| 2018/0180384 A1* | 6/2018 | Zhang | F41G 3/08 |
| 2020/0264283 A1* | 8/2020 | Fu | G01S 7/4876 |
| 2020/0278560 A1* | 9/2020 | Dohr | G01C 3/04 |
| 2020/0284551 A1* | 9/2020 | Brown | F41G 1/473 |
| 2022/0221249 A1* | 7/2022 | Graber | F41B 5/12 |
| 2022/0243265 A9* | 8/2022 | Rothberg | G01N 21/648 |

FOREIGN PATENT DOCUMENTS

| | | | |
|---|---|---|---|
| CN | 113865431 A | * | 12/2021 |
| TW | 201606258 A | | 2/2016 |

OTHER PUBLICATIONS

English Translation of Wang CN-108731542-A Description (Year: 2018).*

English Translation of Zhou CN-202361892-U Description (Year: 2012).*

* cited by examiner

FIG. 4

RANGING AND BALLISTIC DISPLAY OPTICAL SIGHT

CROSS-REFERENCE TO RELATED APPLICATIONS

This application claims the benefit of priority to Chinese Patent Application No. CN202211004038.7 filed Aug. 18, 2022, which is hereby incorporated by reference in its entirety.

TECHNICAL FIELD

This invention relates to the technical field of sight, especially ranging and ballistic display sight.

BACKGROUND

When shooting outdoors, the sight, as a necessary accessory for aiming rifles or crossbows, is an important equipment to help shooters hit the target. However, in actual shooting, sight is not enough. Because of the ballistic deflection, only compensated aiming can be accurate aiming. In order to achieve accurate aiming, it is necessary to measure the target distance, calculate the trajectory compensation value, and then adjust the collimator to correct the aiming. The whole process is complicated, which makes precision shooting inefficient.

SUMMARY OF THE INVENTION

The technical problem to be solved by the invention is to provide a ranging and ballistic display sight to greatly improve accurate shooting efficiency.

To solve the above technical problems, the technical solution of the invention is as follows:

A ranging and ballistic display optical sight including:

A mounting bracket;

A control mainboard fixedly connected with the mounting bracket;

A laser transmitting device arranged on the control mainboard and electrically connected with the control mainboard;

A laser receiving device arranged on the mounting bracket and electrically connected with the control mainboard;

An objective lens group arranged on the control mainboard;

A beam splitter prism group arranged behind the objective lens group and collimated coaxial with the objective lens group; the beam splitter prism group is directly above the laser receiving device and is fixedly connected with the laser receiving device; the laser emitted by the laser transmitting device shoots to the target, the reflected light is transmitted to the beam splitter prism group through the objective lens group, and then shot into the laser receiving device by reflecting on the beam splitter prism group;

A digital reticle plate arranged behind the beam splitter prism group and collimated coaxial with the beam splitter prism group; the digital reticle plate is fixed on the mounting bracket;

The laser transmitting device sends the first time of the laser transmitting to the control mainboard;

The laser receiving device sends the second time of the laser transmitting to the control mainboard;

According to the time difference between the first time and the second time, the control mainboard obtains the ranging result, and outputs the result on the digital reticle plate.

Optionally, the ranging and ballistic display optical sight, also includes: an image rotating lens group arranged behind the beam splitting prism group, and collimated coaxial with the beam splitting prism group and the digital reticle plate.

Optionally, the ranging and ballistic display optical sight, also includes: an eyepiece set located behind the digital reticle and collimated coaxial with the digital reticle.

Optionally, the upper outer surface of the eyepiece group is provided with a focusing wheel.

Optionally, the objective lens group, the spectroscopic prism group, the image rotating lens group, the laser receiving device, the digital reticle plate, and the eyepiece set are all arranged in the aiming body.

Optionally, the front and back of the objective lens group are respectively coated with an antireflection film;

The front and back of the spectroscopic prism group are respectively coated with an antireflection film, and the middle bevel is coated with a total reflection film;

The front of the image rotator lens group is coated with an antireflection film;

The front of the eyepiece group is coated with an antireflection film;

The back of the laser transmitting device is coated with an antireflection film.

Optionally, the ranging and ballistic display optical sight, also includes the panel fixedly connected to the aiming body and electrically connected with the control mainboard, and at least one key is set on the panel.

Optionally, the control mainboard is also provided with a data interface, which is used to input a ballistic calculation program for real-time calculation of trajectory compensation into the control mainboard and output the data from the control mainboard.

Optionally, the ranging and ballistic display optical sight, also includes:

A laser indicator light arranged on one side of the laser transmitting device and electrically connected with the control mainboard.

Optionally, the ranging and ballistic display optical sight, also includes: a power supply system, and the control mainboard is electrically connected with the power supply system; the digital reticle plate is fixed on the mounting bracket through a height adjusting bolt; a wind deflection adjusting bolt is also provided on the side of the mounting bracket.

The scheme of the invention at least has the following beneficial effects:

The laser ranging receiving optical system and the aiming optical system are organically and uniformly designed. The safe low power laser is emitted through the laser transmitting device outside the collimator. After being reflected by the target, the receiving laser beam is refracted to the laser receiving device inside the collimator by using the collimator objective lens group and the beam splitter prism group, and the control motherboard conducts data acquisition and processing to complete the real-time ranging; and it can display the range, angle and trajectory points on the high-definition digital reticle in real time, so that the shooter can accurately aim at the target in time, greatly improving the precision shooting efficiency.

BRIEF DESCRIPTION OF DRAWINGS

Figure 4:
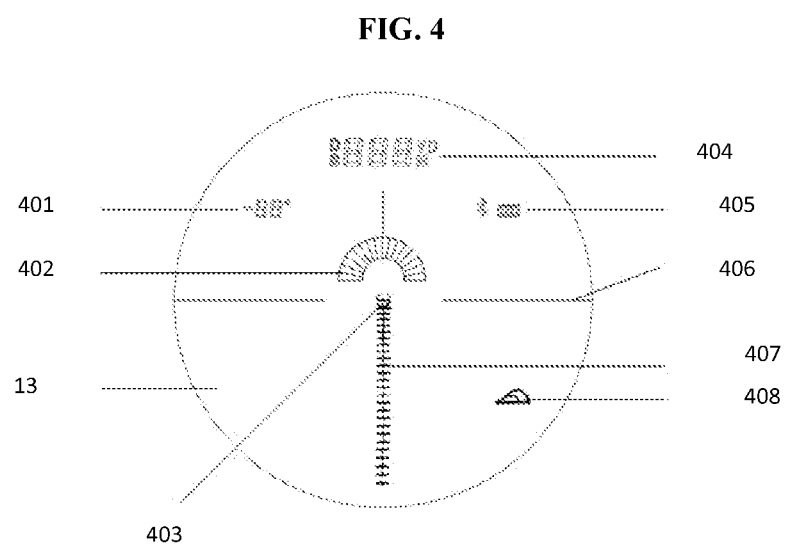

FIG. 4 is a structure diagram of the digital reticle plate.

Figure 1:
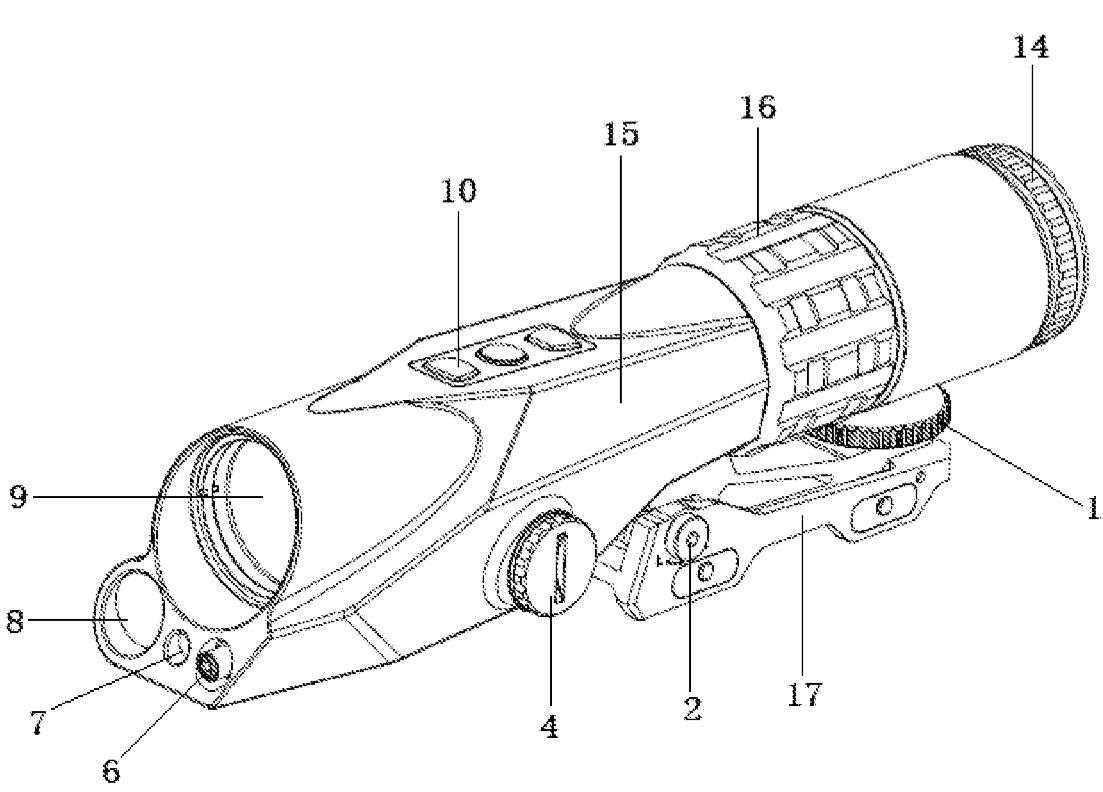
FIG. 1 is a 3D structure diagram of the ranging and ballistic display optical sight.
Figure 2:
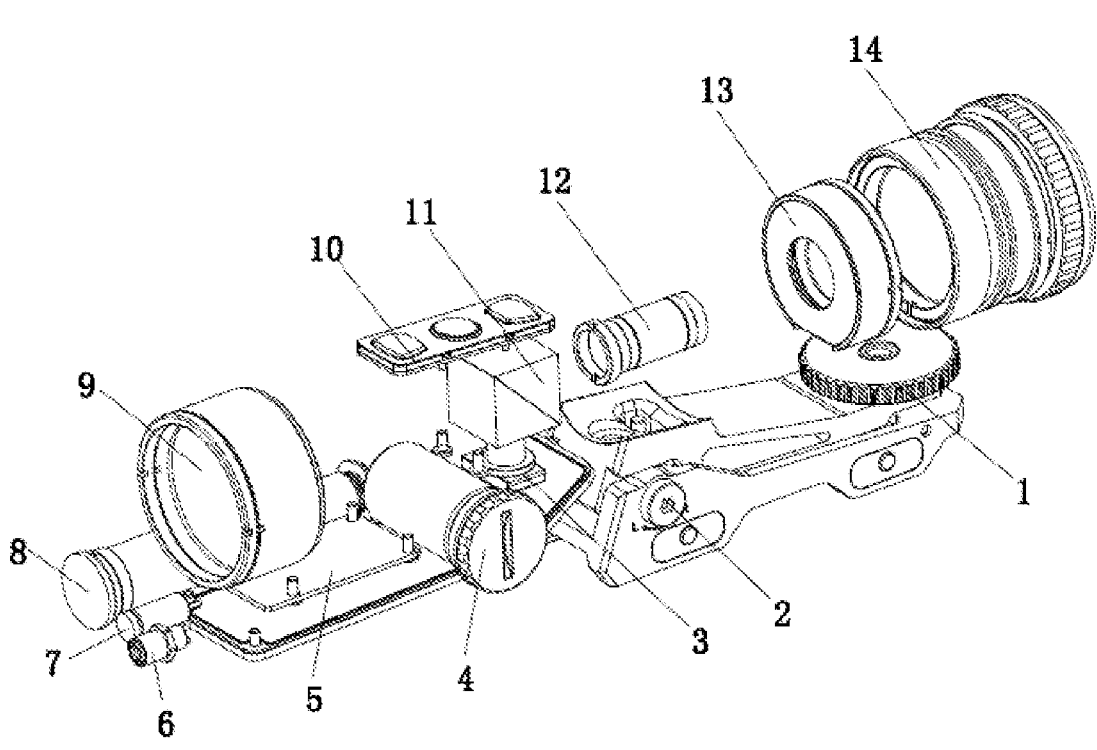
FIG. 2 is a schematic diagram of the breakdown structure of the ranging and ballistic display optical sight.
Figure 3:
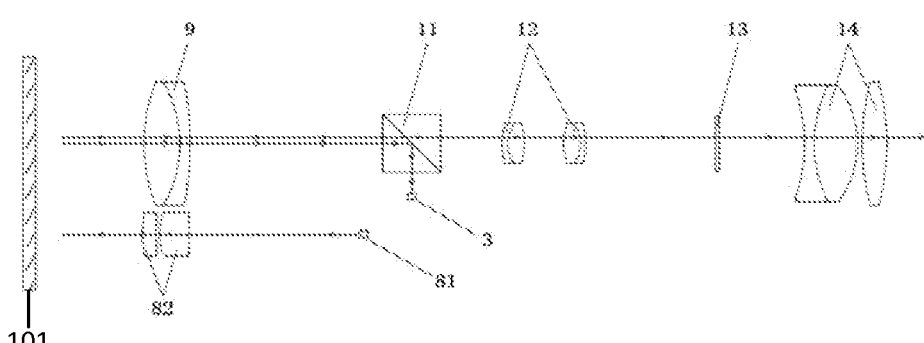
FIG. 3 is a structure diagram of the optical aiming and laser receiving optical path system.

In the figure: 1. Height adjusting bolt; 2. Wind deflection adjusting bolt; 3. Laser receiving device; 4. Power supply system; 5. Control mainboard; 6. Data interface; 7. Laser indicator light; 8. Laser transmitting device; 81. Laser transmitter; 82. Laser transmitting lens group; 9. Objective lens group; 10. Panel; 11. Beam splitter prism group; 12. Image rotator lens group; 13. Digital reticle plate; 14. Eyepiece group; 15. The sight body; 16. Focusing wheel; 17. Mounting bracket.

101. Target; 401. Upward and downward deflection angle value; 402. Left and right deflection angle indication; 403. Central quick sight circle; 404. Range value; 405. Battery and Bluetooth symbols; 406. Cross marking; 407. Ballistic point; 408. Ballistic compensation symbol.

DETAILED DESCRIPTION OF INVENTION

Exemplary applications of the invention are described in more detail below with reference to the attached figures. Although exemplary applications of the invention are shown in the attached figures, the invention can be implemented in various forms and should not be limited by the applications described herein. On the contrary, these applications are provided to enable a more thorough understanding of the invention, and to fully convey the scope of the invention to technicians in the field.

Referring to FIGS. 1-5, the application of the invention provides a ranging and ballistic display optical sight, which comprises a mounting bracket 17; the control mainboard 5 fixedly connected with the mounting bracket 17; a laser transmitting device 8 arranged on the control mainboard 5 and electrically connected with the control mainboard 5; a laser receiving device 3 arranged on the mounting bracket 17 and electrically connected with the control mainboard 5; an objective lens group 9 arranged on the control mainboard 5; a beam splitter prism group 11 arranged behind the objective lens group 9 and collimated coaxial with the objective lens group 9; wherein the spectroscopic prism group 11 is located directly above the laser receiving device 3 and is fixedly connected with the laser receiving device 3. The laser transmitted by the laser transmitting device 8 shoots at the target. After being reflected by the objective lens group 9, the reflected light shoots into the beam splitter prism group 11, and then shoots into the laser receiving device 3 after being reflected by the beam splitter prism group 11. A digital reticle 13 is arranged behind the beam splitter prism group 11 and collimated coaxial with the beam splitter prism group 11, and the digital reticle 13 is fixed on the mounting bracket 17. The laser transmitting device 8 transmits the laser to the control mainboard 5 at the first time; the laser receiving device 3 sends the second time of receiving laser to the control mainboard 5; the control mainboard 5 obtains the ranging result according to the time difference between the first time and the second time, and outputs the ranging result on the digital reticle plate 13. Here, the control mainboard 5 obtains a measurement distance according to the product of the time difference between the first time and the second time and the laser propagation velocity, and further determines the ballistic compensation value according to the measurement distance and the preset ballistic compensation program, and the ballistic compensation value is displayed on the digital reticle plate 13. Specifically, the preset ballistic compensation program includes comparing a measured distance with a preset standard distance, and if the measured distance is greater than the preset standard distance, obtaining a first distance and angle from a preset attitude adjustment table, adjusting a weapon attitude according to the first distance and angle, moving a lighted ballistic point to the target, and aiming accurately; otherwise, obtaining a second distance and angle from the preset attitude adjustment table, adjusting the weapon attitude according to the second distance and angle, moving the lighted ballistic point to the target, and aiming accurately.

In this application of the invention, the laser ranging receiving optical system and the aiming optical system are organically and uniformly designed. The safe low power laser is transmitted through the laser transmitting device 8 outside the aiming lens. After being reflected by the target 101, the received laser is refracted onto the laser receiving device 3 inside the aiming body by using the aiming lens group 9 and the splitter prism group 11, and the mainboard 5 is controlled to conduct data acquisition and processing to complete the real-time ranging; in addition, it can display the range, angle and ballistic points on the high-definition digital reticle plate 13 in real time, so that the shooter can accurately aim at the target in real time, to greatly improving the precision shooting efficiency.

In an optional application of the invention, the ranging and ballistic display optical sight also includes: an image rotator lens group 12 which is arranged behind the beam splitter prism group 11 and is collimated coaxial with the beam splitter prism group 11 and the digital reticle plate 13;

an eyepiece group 14 located behind the digital reticle plate 13 and collimated coaxial with the digital reticle 13.

Here, the objective lens group 9, the beam splitter prism group 11, the image rotator lens group 12 and the eyepiece group 14 are an optical aiming system to collimated coaxial the optical aiming system with the laser receiving optical path system, so that its overall performance can meet the design requirements.

In an optional application of the invention, the upper outer surface of the eyepiece group 14 is provided with a focusing wheel 16, thereby realizing the adjustment of different focal lengths.

In an optional application of the invention, the objective lens group 9, the splitter prism group 11, the image rotator lens group 12, the laser receiving device 3, the digital reticle plate 13, and the eyepiece group 14 are all set in the aiming body 15.

In this application, the objective lens group 9, the splitter prism group 11, the image rotator lens group 12, the laser receiving device 3, the digital reticle plate 13, and the eyepiece group 14 are assembled in the aiming body 15, so that the functions of rapid aiming, laser ranging and angle measurement, ballistic compensation, digital reticle, and high-definition display integration can be realized, and the efficiency and hit rate of shooters during shooting can be greatly improved.

In an optional application of the invention, the front and back of the objective lens group 9 are respectively coated with antireflection films; optionally, 905 nm antireflection film is coated on the front of objective lens group 9, and 400-760 nm antireflection film is coated on the back of objective lens group 9 to enhance the light transmission performance of objective lens group 9 while reducing the reflective effect.

The front and back planes of the splitter prism group 11 are respectively coated with antireflection films, and the middle bevel is coated with a total reflection film; optionally, 905 nm antireflective film is coated on the front of the splitter prism group 11, 400-760 nm antireflective film is coated on the back of the splitter prism group 11, and 905 nm total reflective film is coated on the middle bevel; similarly, the light transmission performance of the beam splitter prism group 11 is enhanced while the reflective effect is weakened.

An antireflection film is coated on the front of the image rotator lens group 12; optionally, 400-760 nm antireflection film is coated on the front of the image rotator lens group 12; similarly, the light transmission performance of the image rotator lens group 12 is enhanced while the reflective effect is weakened.

The front of the eyepiece group 14 is coated with an antireflection film; optionally, 400-760 nm antireflection film is coated on the front of the eyepiece group 14; similarly, the light transmission performance of the eyepiece group 14 is enhanced while the reflective effect is weakened.

The back of the laser transmitting device 8 is coated with an antireflection film; optionally, the back of the laser transmitting device 8 is coated with a 905 nm antireflection film; similarly, the light transmission performance of the laser emission device 8 is enhanced while the reflective effect is weakened.

In an optional application of the invention, the laser transmitting device 8 comprises a laser transmitter 81 and a laser transmitting lens group 82 fixedly connected with the laser transmitter 81, which can also be integrally formed, and the antireflection film is plated behind the laser transmitting lens group 82.

In an optional application of the invention, the ranging and ballistic display optical sight also includes the panel 10 fixedly connected to the aiming body 15, wherein the panel 10 is electrically connected to the control mainboard 5, and the panel 10 has at least one key.

Figure 5:
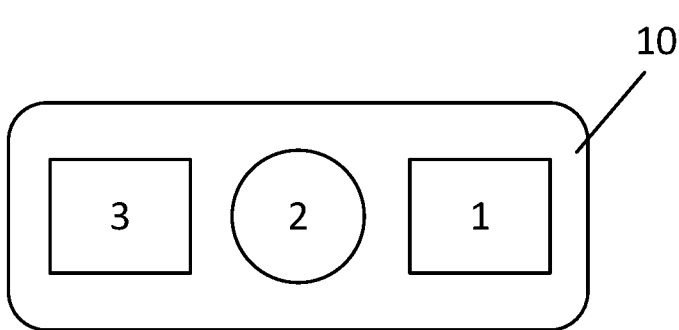
FIG. 5 is an interface diagram of the panel and buttons of the ranging and ballistic display optical sight.

In FIG. 5, the schematic diagram of the panel 10 of the control main board 5 is shown. Through the panel 10, the control of various functions of the ranging and ballistic display sighting can be realized, as shown below:

Switch on/off: long press the key 1 to turn on or off; when it is turned on, the digital reticle plate 13 lights up at the same time;

Measurement: press 1 to measure distance and angle;

Single point scanning switching: when pressing 2, the switching icon flashes, then press 3 to switch, and the function is determined after 3 seconds of inactivity; when entering the scanning measurement mode, it will automatically measure continuously;

Meter/yard switching: when pressing 2, the switching icon flashes, then press 3 to switch, and the function is determined after 3 seconds of inactivity;

Bluetooth connection: when pressing 2, the switching icon flashes, and then press 3 to switch;

Laser indication: press and hold 2 to turn laser indication on or off;

Switch red/green lights: long press 3 to switch red/green lights;

Backlight brightness adjustment: double press 3 to enable backlight adjustment; then press 3 again to switch strong, medium, weak and off;

Furthermore, the ranging and ballistic display optical sight can also include a Bluetooth module, which is set on the control motherboard 5, and realizes the functions of data mutual transmission and communication.

In an optional application of the invention, the control mainboard 5 is also provided with a data interface 6, which is used to input a ballistic compensation program for real-time calculation of ballistic compensation into the control mainboard 5, and output the data of the control main board 5. The ballistic calculation program, as described above, compares the measured distance with the preset standard distance. If the measured distance is greater than the preset standard distance, obtain the first distance and angle from the preset posture adjustment table, adjust the weapon attitude according to the first distance and angle, move the lighted ballistic point to the target, and aim accurately; otherwise, obtain the second distance and angle from the preset attitude adjustment table, adjust the weapon attitude according to the second distance and angle, move the lighted ballistic point to the target, and aim accurately. In this application, data interface 6 is reserved to facilitate users to independently place ballistic programs; high-definition transparent digital reticle plate 13, which can display ballistic points, ranging and angle values in real time.

In an optional application of the invention, the ranging and ballistic display optical sight also includes a laser indicator light 7 which is arranged on one side of the laser transmitting device 8 and electrically connected with the control mainboard 5. Here, the laser indicator light 7 indicates aiming, so that the shooter can quickly find the target.

In an optional application of the invention, the ranging and ballistic display optical sight also includes: power supply system 4, the control mainboard 5 being electrically connected with the power supply system 4. The power supply system 4 supplies power for each component of the ranging and ballistic display optical sight, for realizing the functions of each component under the control of the control mainboard 5.

The digital reticle plate 13 is fixed on the mounting bracket 17 by the height adjusting bolt 1, and the height of the digital reticle plate 13 can be adjusted; the side of the mounting bracket 17 is also provided with a wind deflection adjusting bolt 2, which can adjust the left and right offset of the digital reticle plate 13; the visual zeroing of the sight can be conveniently completed by combining the two adjustments.

The preparation process of the ranging and ballistic display optical sight described in the above applications of the invention includes:

1. Fabrication of overall structure: process and fabricate aiming body 15, mounting bracket 17, height adjusting bolt 1, wind deflection adjusting bolt 2 and various metal parts according to design requirements.

2. Fabrication of each optical lens group: design and customize objective lens group 9, and respectively coat 905 nm and 400-760 nm antireflection film on the front and back of objective lens group 9; after the beam splitter prism group 11 is designed and customized, and 905 nm and 400-760 nm antireflection coatings are respectively coated on its front and back planes, and 905 nm total reflection coatings are coated on its middle bevel; design and customize the image rotator lens group 12, and coat 400-760 nm antireflection film on its front; design and customize the eyepiece set 14, and coat 400-760 nm antireflection film on its front; design and customize the laser transmitting lens group 82, and coat 905 nm antireflection film on its back.

3. Fabrication of laser transmitting and receiving device: customize the 905 nm laser transmitter 81, and fix it with the laser transmitting lens group 82 according to the design requirements to fabricate the laser transmitting device 8; customize the laser receiver and fix it directly below the beam splitter prism group 11 according to the design requirements to complete the fabrication of the laser receiver 3.

4. Making circuit system and laser indicator light: customize the integrated circuit control mainboard 5 with Bluetooth module, and setup the relevant control program; customize data interface 6, function key 10, laser indicator light 7; and connect them to the control mainboard 5 to complete the production of the circuit system and laser indicator light 7.

5. Fabrication of digital reticle plate: according to the design requirements, open the mold to customize the OLED high-definition display screen with high transmittance, and connect it with the control mainboard 5 for preliminary testing, so that it can display the cross reticle, laser ranging data, angle value and ballistic point in real time, then complete the fabrication of digital reticle plate 13.

6. Overall assembly: all parts shall be installed and fixed according to the design requirements and steps to complete the overall assembly.

7. Calibration and debugging: put the battery into the power supply system 4 for preliminary product testing; assemble the overall product and conduct overall debugging of laser transceiver, overall circuit, communication, display, function key and optical system, and calibrate the laser ranging and optical aiming system to make its performance meet the design requirements.

8. Carry out aging, waterproof and other environmental tests on the calibrated products, and finally complete the fabrication of end products.

Figure 6:
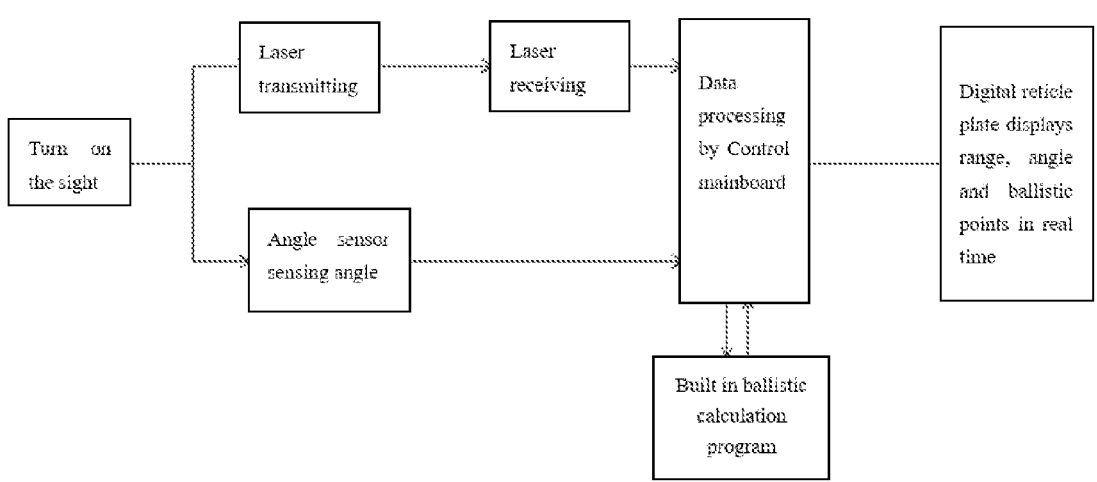
FIG. 6 is a workflow diagram of ranging and ballistic display sight.

As shown in FIG. 6, the working steps of the above ranging and ballistic display optical sight of the invention include:

1. Long press the function key 1 on the panel 10 to turn on the sight.

2. Quickly find target 101 through laser indicator light 7 or central quick sight circle 403 on digital reticle plate 13.

3. The laser transmitting device 8 transmits the laser. Upon reflection by the aiming target, the laser reaches the beam splitter prism group 11 after being collimated coaxial with the objective lens group 9. After being reflected by the middle bevel of the beam splitter prism group 11, the laser shoots into the laser receiving device 3, and completing the transmission and reception of the primary laser and recording the time difference between them.

4. The transmitted and received laser signals are converted into photoelectric signals, and the integrated circuit control mainboard 5 processes the real-time data, and the ranging result, namely the ranging value 404, is output and displayed on the high-definition and high transmittance digital reticle plate 13.

5. The built-in angle sensor senses the upward and downward deflection angle value 401 and the left and right deflection angle indication 402 of light weapons in real time.

The ballistic program built in the control mainboard 5 calculates the ballistic compensation in real time. After being processed by the control mainboard 5, the results are also displayed on the digital reticle plate 13 in real time.

6. The function keys 1, 2 and 3 can be adjusted to realize single point or scanning pro measurement, unit switching, laser indicator light 7 on, light color switch, backlight selection, etc.

7. Adjust the weapon attitude with the range and angle displayed on the digital reticle plate 13. And move the lighted ballistic point 407 (the user must put in the autonomous ballistic program) to the target for accurate targeting.

The range measurement, angle and ballistic point of the target targeted by the shooter are displayed on the digital reticle plate 13 in real time, which fully realizes the intelligent range measurement and ballistic display function of the sight. The digital reticle plate 13 also displays the battery, Bluetooth symbol 405, cross marking 406 and ballistic compensation symbol 408.

8. After accurate aiming, start shooting.

The application of the invention synchronizes the aiming, laser ranging, ballistic compensation and display, which ensures timely correction after aiming and timely shooting at the target, and greatly improves the shooter's precision shooting efficiency and hit rate. In addition, there are many technical advantages such as integrated compact design, small size, light weight, far ranging, safe low power 905 nm laser, reserved user placement of ballistic program interface and high-definition electronic graduation display, etc. The aiming body is designed with laser spotlights to indicate aiming, which is convenient to find targets quickly. It greatly improves the efficiency and hit rate of shooters on shooting.

The above is the preferred application of the invention. For ordinary technicians in the technical field, certain improvements and embodiments can be made without departing from the principles of the invention. These improvements and embodiments should also be considered within the protection scope of the invention.

What is claimed is:

1. A ranging and ballistic display optical sight, comprising:

a mounting bracket (17);

a control mainboard (5) fixedly connected with the mounting bracket (17);

a laser transmitting device (8) arranged on the control mainboard (5) and electrically connected with the control mainboard (5);

a laser receiving device (3) arranged on the mounting bracket (17) and electrically connected with the control mainboard (5);

an objective lens group (9) arranged on the control mainboard (5);

a beam splitter prism group (11) arranged behind the objective lens group (9) and collimated coaxial with the objective lens group (9);

wherein the beam splitter prism group (11) is directly above the laser receiving device (3) and is fixedly connected with the laser receiving device (3);

wherein the laser emitted by the laser transmitting device (8) shoots to a target (101); and wherein the reflected light is transmitted to the beam splitter prism group (11) through the objective lens group (9) and then shot into the laser receiving device (3) by reflecting on the beam splitter prism group (11); and a digital reticle plate (13) arranged behind the beam splitter prism group (11) and collimated coaxial with the beam splitter prism group (11); wherein the digital reticle plate (13) is fixed on the mounting bracket (17); and wherein the laser transmitting device (8) sends a first time of the laser transmitting to the control mainboard (5);

wherein the laser receiving device (3) sends a second time of the laser receiving to the control mainboard (5);

wherein according to the time difference between the first time and the second time, the control mainboard (5) obtains the ranging result, and outputs the result on the digital reticle plate (13);

wherein the control mainboard (5) obtains a measurement distance according to the product of the time difference between the first time and the second time and the laser propagation velocity, and further determines a ballistic compensation value according to the measurement distance and a preset ballistic compensation program, and the ballistic compensation value is displayed on the digital reticle plate (13); and wherein the preset ballistic compensation program includes comparing a measured distance with a preset standard distance, and if the measured distance is greater than the preset standard distance, obtaining a first distance and angle from a preset attitude adjustment table, adjusting a weapon attitude according to the first distance and angle, moving a lighted ballistic point to the target, and aiming accurately; otherwise, obtaining a second distance and angle from the preset attitude adjustment table, adjusting the weapon attitude according to the second distance and angle, moving the lighted ballistic point to the target, and aiming accurately.

2. The ranging and ballistic display optical sight in claim 1, further comprising:

an image rotating lens group (12) arranged behind the beam splitting prism group (11), and aligned with the beam splitting prism group (11) and the digital reticle plate (13).

3. The ranging and ballistic display optical sight in claim 2, further comprising:

an eyepiece set (14) located behind the digital reticle (13) and collimated coaxial with the digital reticle (13).

4. The ranging and ballistic display optical sight in claim 3, wherein the upper outer surface of the eyepiece group (14) is provided with a focusing wheel (16).

5. The ranging and ballistic display optical sight in claim 2, wherein the objective lens group (9), the beam splitter prism group (11), the image rotating lens group (12), the laser receiving device (3), the digital reticle plate (13), and the eyepiece set (14) are all arranged in an aiming body (15).

6. The ranging and ballistic display optical sight in claim 5, wherein the front and back of the objective lens group (9) are respectively coated with an antireflection film;

wherein the front and back of the beam splitter prism group (11) are respectively coated with an antireflection film, and the middle bevel is coated with a total reflection film;

wherein the front of the image rotator lens group (12) is coated with an antireflection film;

wherein the front of the eyepiece group (14) is coated with an antireflection film; and wherein the back of the laser transmitting device (8) is coated with an antireflection film.

7. The ranging and ballistic display optical sight in claim 5, further comprising:

a panel (10) fixedly connected to the aiming body (15) which is electrically connected with the control mainboard (5), and at least one key is set on the panel (10).

8. The ranging and ballistic display optical sight in claim 1, wherein the control mainboard (5) is also provided with a data interface (6), which is used to input a ballistic calculation program for real-time calculation of trajectory compensation into the control mainboard (5) and output the data from the control mainboard (5).

9. The ranging and ballistic display optical sight in claim 1, further comprising:

a laser indicator light (7) arranged on one side of the laser transmitting device (8) and electrically connected with the control mainboard (5).

10. The ranging and ballistic display optical sight in claim 1, further comprising:

a power supply system (4), which is electrically connected with the control mainboard (5);

a height adjusting bolt (1), through which the digital reticle plate (13) is fixed on the mounting bracket (17); and a wind deflection adjusting bolt (2), which is also provided on the side of the mounting bracket (17).

\* \* \* \* \*